(12) United States Patent
Tsun (10) Patent No.: US 8,239,491 B1
(45) Date of Patent: *Aug. 7, 2012

(54) CONTENT REQUEST OPTIMIZATION

(75) Inventor: Stephen Tsun, Cupertino, CA (US)

(73) Assignee: Google Inc., Mountain View, CA (US)

( * ) Notice: Subject to any disclaimer, the term of this patent is extended or adjusted under 35 U.S.C. 154(b) by 856 days.

This patent is subject to a terminal disclaimer.

(21) Appl. No.: 11/554,419

(22) Filed: Oct. 30, 2006

(51) Int. Cl.
*G06F 15/16* (2006.01)
*G06F 15/173* (2006.01)
*G06Q 30/00* (2012.01)

(52) U.S. Cl. ............... 709/219; 709/224; 705/14.67; 705/14.68

(58) Field of Classification Search .............. 709/217, 709/218, 219, 226, 205, 201, 203, 200, 224; 705/14.67, 14.68
See application file for complete search history.

(56) References Cited

U.S. PATENT DOCUMENTS

| | | | |
|---|---|---|---|
| 6,067,565 A * | 5/2000 | Horvitz | 709/218 |
| 6,438,592 B1 * | 8/2002 | Killian | 709/224 |
| 6,725,421 B1 | 4/2004 | Boucher et al. | |
| 6,775,267 B1 * | 8/2004 | Kung et al. | 370/352 |
| 6,795,848 B1 * | 9/2004 | Border et al. | 709/213 |
| 6,807,570 B1 * | 10/2004 | Allen et al. | 709/219 |
| 6,907,566 B1 * | 6/2005 | McElfresh et al. | 715/210 |
| 7,136,875 B2 | 11/2006 | Anderson et al. | |
| 2002/0055966 A1 * | 5/2002 | Border et al. | 709/200 |
| 2002/0072989 A1 * | 6/2002 | Van De Sluis | 705/26 |
| 2002/0091763 A1 * | 7/2002 | Shah et al. | 709/203 |
| 2002/0129102 A1 * | 9/2002 | Landsman et al. | 709/203 |
| 2003/0065580 A1 * | 4/2003 | Obata et al. | 705/26 |
| 2003/0167257 A1 * | 9/2003 | de Bonet | 707/1 |
| 2003/0167324 A1 * | 9/2003 | Farnham et al. | 709/224 |
| 2004/0093327 A1 * | 5/2004 | Anderson et al. | 707/3 |
| 2004/0148275 A1 * | 7/2004 | Achlioptas | 707/3 |
| 2004/0205165 A1 * | 10/2004 | Melamed et al. | 709/219 |
| 2005/0210000 A1 * | 9/2005 | Michard | 707/3 |
| 2005/0256940 A1 * | 11/2005 | Henderson et al. | 709/219 |
| 2006/0218304 A1 * | 9/2006 | Mukherjee et al. | 709/246 |
| 2006/0277477 A1 * | 12/2006 | Christenson | 715/760 |
| 2007/0078709 A1 | 4/2007 | Rajaram | |
| 2007/0136579 A1 * | 6/2007 | Levy et al. | 713/168 |
| 2008/0104194 A1 | 5/2008 | Tsun et al. | |
| 2009/0024548 A1 * | 1/2009 | Zhu et al. | 706/21 |

FOREIGN PATENT DOCUMENTS

| | | | |
|---|---|---|---|
| EP | 0822535 | * | 1/1997 |
| WO | WO02/15531 A1 | | 2/2002 |

OTHER PUBLICATIONS

Becta Technical Papers "Web Caches" 2005 [online], [retrieved on Jan. 28, 2008]. Retrieved from the Internet <URL: http://foi.becta.org.uk/content_files/corporate/resources/technology_and_education_research/web_caches.pdf>.

(Continued)

*Primary Examiner* — Joseph Avellino
*Assistant Examiner* — Aftab Nasir Khan
(74) *Attorney, Agent, or Firm* — Fish & Richardson P.C.

(57) ABSTRACT

The occurrence of a request event is monitored during the rendering of a browser page. In response to monitoring the occurrence of the request event, content item request instructions are loaded and executed to generate one or more content item requests based on the content item request instructions.

8 Claims, 6 Drawing Sheets

OTHER PUBLICATIONS

Brattli, T. "Dynamic data using the DOM and Remote Scripting." dhtml central.com. Feb. 21, 2001 (4 pages).

Mohan, C. "Caching Technologies for Web Applications" [online]. Sep. 2001 (31 pages). [retrieved on Jan. 28, 2008]. Retrieved from the Internet: <URL: http://www.almaden.ibm.com/u/mohan/Caching_VLDB2001.pdf>.

"Nagle's algorithm." Wikipedia, the free encyclopedia [online], pp. 1-2 [retrieved on Jan. 7, 2009]. Retrieved from the Internet <http://en.wikipedia.org/wiki/Nagle's_algorithm>.

Nagle, J. "Congestion Control in IP/TCP Internetworks." Network Working Group [online]. Jan. 6, 1984, pp. 1-9. [retrieved on Jan. 7, 2009]. Retrieved from Internet <http://tools.ietf.org/rfc/rfc896.txt>.

Xie, X. et al. "Maximizing Information Throughout for Multimedia Browsing on Small Displays" In Multimedia and Expo, 2004, ICME '04. IEEE International Conference, vol. 27-30 Jun. 2004, pp. 2143-2146 vol. 3, [online], [retrieved Jan. 28, 2008]. Retrieved from the Internet: <http://research.microsoft.com/asia/dload_files/group/ims/26.pdf>.

U.S. Appl. No. 11/554,423, filed Oct. 30, 2006.

\* cited by examiner

CONTENT REQUEST OPTIMIZATION

FIELD

This disclosure relates to information retrieval.

BACKGROUND

Content displayed on a web page can be generated by one or more content item servers in response to content item requests that are generated during the rendering of the web page by a client device. The content item requests can be generated synchronously with respect to the rendering of the web page. Likewise, the content items received in response to the content item requests can be processed synchronously with respect to the rendering of the web page. For example, when a web page is rendered, a javascript may execute and request an advertisement from an advertisement server. If the advertisement is retrieved synchronously, the rendering of the web page is delayed until a requested advertisement is received from the advertisement server. Once the advertisement is received and rendered, e.g., displayed on the web page, the rendering of the remainder of the web page resumes.

A drawback of synchronous content item retrieval, however, is that if a content item server is slow or temporarily inoperable, then the remainder of the web page will not render. To mitigate the potentially deleterious effects of synchronous content item processing, an asynchronous content item environment can be defined, e.g., an iFrame. However, a web page publisher may desire that a content item be an integrated feature of a web page and not defined within an iFrame, or that a content item be presented in a synchronous content item environment. Additionally, it is often a relatively complex task to recode a web page source file to ensure that content items are retrieved asynchronously, e.g., recoding to ensure that content items are rendered in an iFrame.

SUMMARY

Disclosed herein are systems and methods for generating content item requests and retrieving content items requests for a web page in a manner that does not impede the rendering of the remainder of the web page. In an implementation, a system includes a data store storing page instructions, monitoring instructions, and loading instructions. Upon execution by a browser, the page instructions cause the browser to render a web page, and the monitoring instructions cause the browser to monitor for the occurrence of a request event. In response to the monitored occurrence of the request event, the loading instructions are executed, which causes the browser to append content item request instructions to the page instructions, and execution of the content item request instructions by the browser causes the browser to transmit one or more content item requests to a content item server.

In an implementation, a browser renders in a first thread a web page from a source document, and defines in the first thread one or more content item environments in the web page. In a second thread, the browser monitors for an occurrence of a request event. In response to the occurrence of the request event, the browser loads in the second thread content item request instructions and executes the content item request instructions in the second thread to generate one or more content item requests.

In an implementation, a browser renders a browser page according to instructions in a source document, and monitors for an occurrence of a request event. In response to monitoring the occurrence of the request event, the browser loads content item request instructions in the source document and generates one or more content item requests based on the content item request instructions.

These and other example implementations can include one or more of the following features or advantages. In one implementation, the rendering of web page content defined in a source document is handled by a first thread, and the content item request processing and content item rendering are handled by a second thread. Accordingly, a slow or non-responsive content item server will not delay processing and rendering of the web page content handled by the first thread. Additionally, content item environments need not be defined in asynchronous environments, e.g., iFrames, to support asynchronous processing.

DETAILED DESCRIPTION

Figure 1:
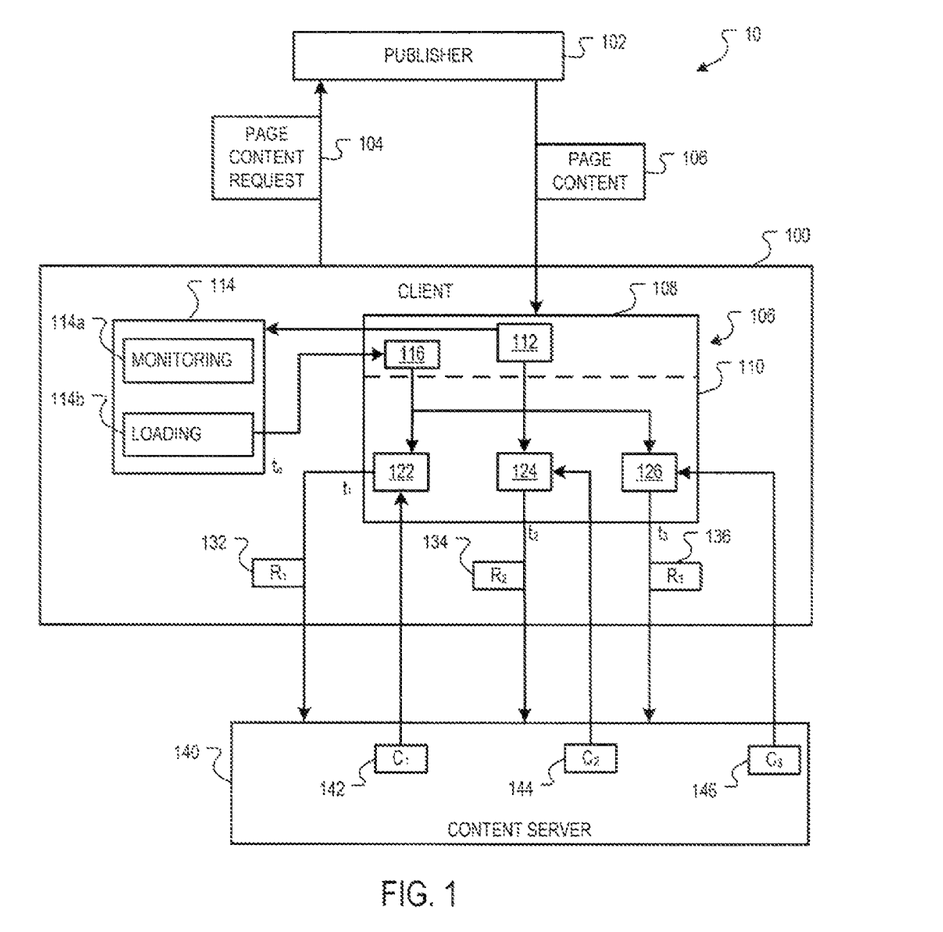
FIG. 1 is a block diagram of an exemplary system for requesting content from a source.

FIG. 1 is a block diagram of an exemplary system 10 for requesting content from a source, e.g., a content item server. In one implementation, the content may include advertisements ("ads"), and the content item server can be an advertisement server. Different types of content can also be requested, e.g., weather, driving directions, trivia, etc.

The requesting device, in the implementation shown, is a client system 100 that is configured to visit web pages over a network, e.g., the Internet. The client system 100 can, for example, be a web browser, a computing device, a mobile communication device, or some other device executing network navigation software and the like. The web address visited by the client system 100 can be resolved to identify a publisher 102, e.g., a server, hosting a corresponding web page. The client system 100 thus sends a web page content request 104 to the publisher 102 for the web page content 106, e.g., a hypertext markup language (HTML) source document, and the publisher 102, in response to the request, provides the web page content 106 to the client system 100.

In an implementation, the web page content 106 can, for example, include a head section 108 and a body section 110, each section having interpreted instructions. The head section 108 can, for example, be interpreted before the body section 110. In an implementation, first instructions 112 are executed in the head section 108 to define one or more content item environments 122, 124 and 126 in the web page. For example, the content item environments 122, 124 and 126 can comprise advertisement slots that are rendered and displayed in the approximate positions as depicted in the body section 110 of the web page content 106. In one implementation, the content item environments 122, 124 and 126 can be synchronous environments, e.g., within the same frame in which the web page content 106 is rendered, within a div, etc. In another implementation, the content item environments 122, 124 and 126 can be asynchronous environments, e.g., iFrames.

In an implementation, the first instructions 112 can, for example, include a reference to a set of second instructions 114, e.g., a function call. For example, the first instructions 112 can generate a preliminary content item request as a function call, e.g., "fetch_content_items( )" which calls the second instructions 114. The second instructions 114 can, for example, include monitoring instructions 114a and loading instructions 114b that are used to monitor for the occurrence of a request event and generate content item request instructions and/or content item requests in response to the occurrence of the request event. In an implementation, the second instructions 114 are provided by a content item server 140, e.g., an advertisement server, and are stored at the client system 100, such as in a cache associated with a web browser.

In an implementation, execution of the first instructions 112 causes the monitoring instructions 114a to execute a process that will trigger a request event. The process can, for example, be realized by a timer, the expiration of which is associated with the occurrence of a request event. In response to the monitoring of the request event, the loading instructions 114b can be executed to load content item request instructions 116 that, upon execution, cause the client system 100 to generate content item requests for the content environment 122, 124 and 126.

In one implementation, a client system 100 can execute a browser that can instantiate multiple threads. In this example implementation, the monitoring instructions 114a can generate a timer of a relatively short duration, e.g., 10 milliseconds, which instantiates a separate thread. The subsequent execution of the loading instructions 114b likewise occurs in the separate thread. Thereafter, the issuing of the content item requests upon execution of the content item request instructions 116 and the rendering of the content items in the corresponding content item environments 122, 124 and 126 occur in the second thread, while the rendering of the remainder of the web page content 106 occurs in the original thread. Thus, if a content item server, such as the content item server 140, is busy or slow in responding, the rendering of the remainder of the web page content 106 is not delayed.

For example, while rendering the web page content 106, the client system 100 defines one or more content item environments 122, 124 and 126, e.g., advertisement slots, and renders the web page content 106 in a first thread. Execution of the first instructions 112 generates a call to the second instructions 114. The monitoring instructions 114a start a timer that instantiates a second thread. At a time $t_e$ the timer expires. In response to the monitoring of the expiration of the timer, the loading instructions 114b, also executing in the second thread, load the content item request instructions 116.

The content item request instructions 116 are executed in the second thread after loading and generate the content item requests 132, 134 and 136, e.g., advertisement requests, for the content item environments 122, 124 and 126. In one implementation, separate advertisement requests 132, 134 and 136 are generated for each of the content item environments 122, 124, and 126 at times $t_1$, $t_2$ and $t_3$, respectively. In another implementation, the content item requests 132, 134 and 136 are generated as a single request. For example, the requests 132, 134 and 136 can be concatenated and sent to the content item server 140 as a single content item request.

A content item server 140, e.g., an advertisement server, receives the requests 132, 134 and 136, and provides the content items 142, 144 and 146, respectively, in response. In response to receiving the content items 142, 144 and 146, the client system 100 renders the content items 142, 144 and 146 in the second content item environments 122, 124 and 126, respectively. In an implementation, the rendering of the content items 142, 144 and 146 can also performed in the second thread.

In one implementation, the first instructions 112 and the second instructions 114 can, for example, comprise javascripts. The first instructions 112 can comprise a javascript for a content item request function call, and be provided by a content item provider to publishers to insert into their respective web page content 106 to request content items.

The second instructions 114 can, for example, comprise a javascript that is called by the first instructions 112. Upon such a call, the second instructions 114 are executed and set a timer, and in response to an expiration of the timer, load a script block using, for example, Dynamic Hypertext Markup Language (DHTML). For example, the execution of the instructions 112 can set the timer     window.setTimeout("ContentEngine.reallyFetch
       Content( );", this.INITIAL_DELAY);

where INITIAL_DELAY is a timer duration, e.g., 10 milliseconds. Expiration of the timer generates a call to the function reallyFetchContent( ), which then creates a script block using DHTML according to the following script:

var head=document.getElementsByTagName("head")[0];
    var script=document.createElement("script");
    script.src=sourcelocation;
    head.appendChild(script);

Execution of the above script block loads the content item request instructions 116 stored in the javascript "script" in the head section 108 of the web page content 106. The content item request instructions 116 are processed in a thread, e.g., a timer thread, that is separate from the main thread that is rendering the web page content 106. Accordingly, a non-responsive or slow content item server 140 will not impede the rendering of the remainder of the web page content 106.

In another implementation, the content item request instructions 116 can be loaded in the body section 110 of the web page content 106.

The content request optimization process described above thus allows for the processing of other instructions, e.g., javascripts, by a main browser thread while rendering the page content 106. Because the content item request instructions 116 are not loaded when the web page content 106 is initially processed by the main thread, the processing of other javascripts or other instructions need not be temporarily suppressed during the rendering of the web page content 106.

In another implementation, the monitoring instructions 114a can generate a timer of a relatively long duration, e.g., several seconds, to ensure that the web page content 106 is rendered before processing the content item request instructions 116. This implementation may be utilized in the case of a client 100 executing a browser that does not implement multiple thread processing.

Figure 2:
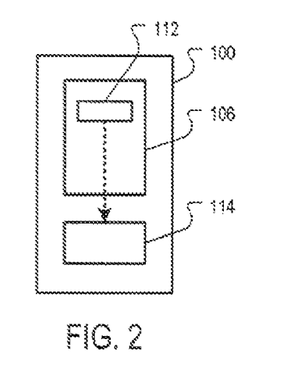
FIG. 2 is a block diagram of a source document and external instructions.

In one implementation, the instructions 114 can be provided by the content item server 140 and stored in a local data store on the client system 100. FIG. 2 is a block diagram of a source document, e.g., web page content 106, and external second instructions 114 stored in a local data store. For example, upon rendering the web page content 106, the client system 100 can determine if the second instructions 114 are stored in a local data store, e.g., a cache associated with a browser application. If the second instructions 114 are not stored in the local data store, the client system 100 can request the second instructions 114 from the content item server 140. The client system 100 can determine for each subsequent access to the stored second instructions 114 whether the stored second instructions 114 are the most recent version. If the stored second instructions 114 are not the most recent version, the client system 100 can request the most recent version of the second instructions 114.

Figure 3:
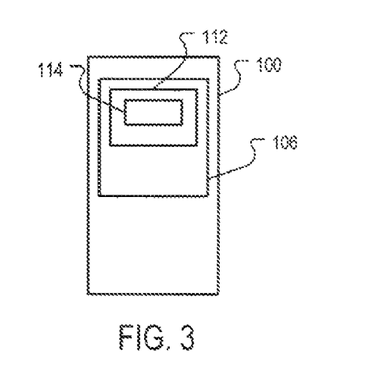
FIG. 3 is a block diagram of another source document and embedded instructions.

FIG. 3 is a block diagram of another source document and embedded second instructions 114. In this implementation, the second instructions 114 are stored as part of the web page content 106.

Figure 4:
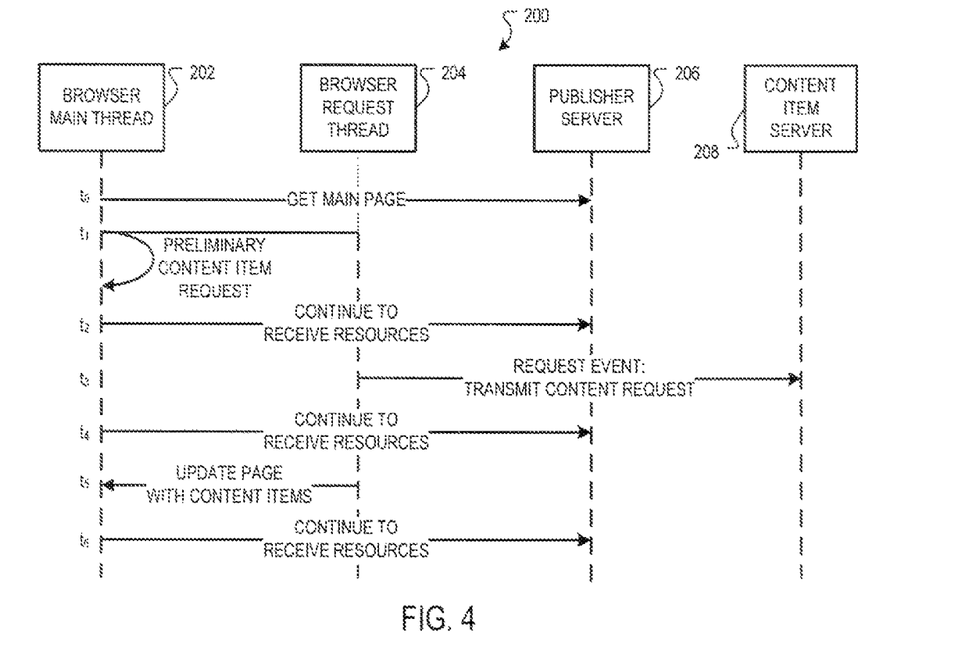
FIG. 4 is a timing diagram of an example content request process.

FIG. 4 is a timing diagram 200 of an example content request process. The timing diagram 200 depicts processes associated with a browser main thread 202, a browser request thread 204, a publisher sever 206 and a content item server 208 as time elapses downward along a vertical axis. Instantiation of the browser main thread 202 and the browser request thread 204 can, for example, occur in the client system 100 of FIG. 1.

At is time $t_0$, a request for page content, e.g., page content request 104, is transmitted to the publisher server 206, which, in turn, begins to send the page content 106 to the client system 100. At a time $t_1$, the browser main thread issues a preliminary content item request. The preliminary content item request can, for example, be implemented by a function call to a stored library to execute the second instructions 114, as depicted in FIG. 2, or can be implemented by executing second instructions 114 stored within the page content 106, as depicted in FIG. 3.

The preliminary content item request, for example, invokes a monitoring process that monitors for a request event, and which instantiates the browser request thread 204. In one implementation, the preliminary content item request initiates a timer that expires at a time $t_3$. The monitoring process can, for example, be instantiated in a browser request thread 204 that is separate from the browser main thread 202.

While the browser request thread 204 processes the monitoring process, the browser main thread 202 continues to process the page content, e.g., by continuing to receive resources from the publishing server 206 at the time $t_2$ and rendering the page accordingly. At the time $t_3$, the monitoring process associates the expiration of the timer with the request event, and in response the corresponding request instructions, e.g., instructions 116, are loaded. The request instructions can, for example, be executed by the browser request thread 204, which causes the browser to transmit a content item request to the content item server 208. While the browser request thread 204 processes the content item request, the browser main thread 202 continues to process the page content, e.g., by continuing to receive resources from the publishing server 206 at the time $t_4$.

At a time $t_5$, the browser request thread 204, having received at least a first content item in response to the content item request transmitted to the content item server 208, updates the rendered page with content items received from the content item server 208. At a time $t_6$, the browser main thread 202 continues to render the web page content 106.

In an implementation, the browser main thread 202 and the browser request thread 204 operate independently, and thus the processing of the events in the browser main thread 202 at times $t_2$, $t_4$ and $t_6$ are independent of the processing of the events in the browser request thread 204 at times $t_3$ and $t_5$. Accordingly, a slow or non-responsive publishing server 206 will not affect the rendering of content items in the web page content 106; likewise, a slow or non-responsive content item server 208 will not affect the rendering of the web page content 106.

The event timings of FIG. 4, e.g., $t_0$-$t_6$, are discretized for illustrative purposes. The event timings need not occur at discrete times, e.g., the browser main thread 202 may receive web page content multiple times or in a near-continuous manner. Additional processing events can also be generated. For example, the browser request thread 204 may generate addition content item requests and render additional content items in the web page.

Figure 5A:
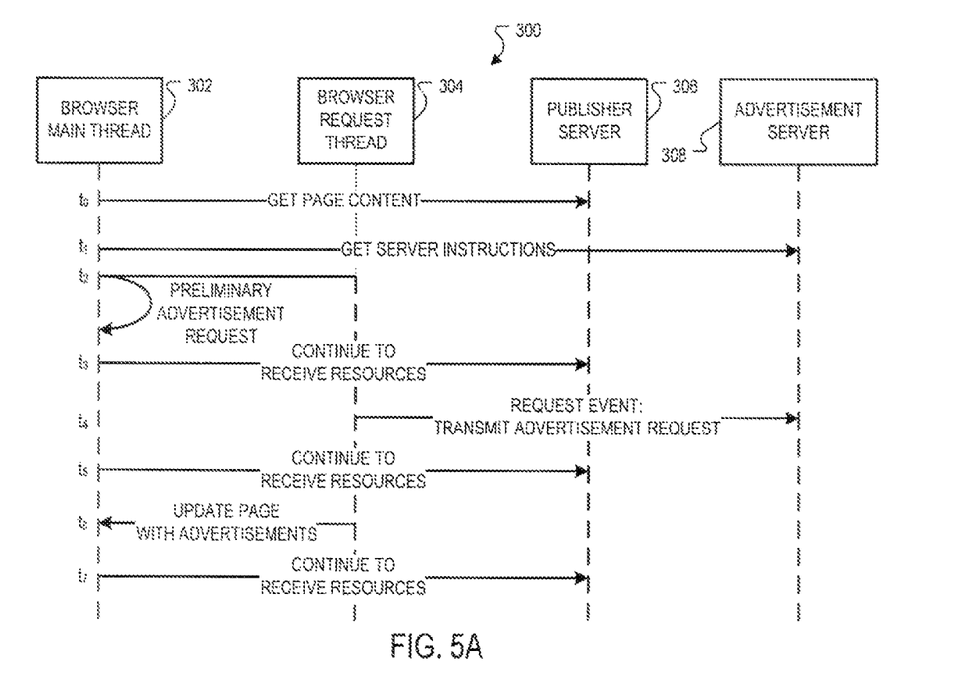
FIG. 5A-5C are timing diagrams of an example advertisement request process.

FIG. 5A is a timing diagram 300 of an example advertisement request process. The timing diagram 300 depicts processes associated with a browser main thread 302, a browser request thread 304, a publisher server 306 and an advertisement server 308 as time elapses downward along a vertical axis. Instantiation of the browser main thread 302 and the browser request thread 304 can, for example, occur in the client system 100 of FIG. 1.

At a time $t_0$, a request for page content, e.g., page content request 104, is transmitted to the publisher server 306 which, in turn, begins to send the page content 106 to the client system 100. At a time $t_1$, the browser main thread 302 determines if advertisement server instructions, e.g., second instructions 114, are stored on the client system 100. If the advertisement server instructions are not stored on the client system 100, the browser main thread 302 requests the advertisement server instructions from the advertisement server 302.

At a time $t_2$, the browser main thread 202 issues a preliminary advertisement request, e.g., a function call to the stored advertisement server instructions. The preliminary advertisement request, for example, invokes a monitoring process that monitors for a request event, and which instantiates the browser request thread 304. In one implementation, the preliminary advertisement request initiates a timer that expires at a time $t_4$. The monitoring process can, for example, be instantiated in a browser request thread 304 that is separate from the browser main thread 302.

While the browser request thread 304 processes the monitoring process, the browser main thread 302 continues to process the page content, e.g., by continuing to receive resources from the publishing server 306 at the time $t_3$ and rendering the page accordingly. At the time $t_4$, the monitoring process associates the expiration of the timer with the request event, and in response corresponding request instructions are loaded and executed by the browser request thread 302, which causes the browser to transmit an advertisement request to the advertisement server 308. While the browser request thread 304 processes the advertisement request process, the browser main thread 302 continues to process the page content, e.g., by continuing to receive resources from the publishing server 306 at the time $t_5$.

At a time $t_6$, the browser request thread 304, having received at least a first advertisement in response to the advertisement request transmitted to the content item sever 308, updates the rendered pages with the advertisements received from the content item server 308. At a time $t_7$, the browser main thread 302 continues to render the web page content 106.

In an implementation, the browser main thread 302 and the browser request thread 304 operate independently, and thus the processing of the events in the browser main thread 302 at the times $t_3$, $t_5$ and $t_7$ are independent of the processing of the events in the browser request thread 304 at the times $t_4$ and $t_6$. Accordingly, a slow or non-responsive publishing server 206 will not affect the rendering of content items in the web page content 106; likewise, a slow or non-responsive content item server 208 will not affect the rendering of the web page content 106.

The event timings of FIG. 5A, e.g., $t_0$-$t_7$, are discretized for illustrative purposes. The event timings need not occur at discrete times, e.g., the browser main thread may receive web page content multiple times or in a near-continuous manner. Additional processing events can also be generated. For example, the browser request thread 304 may generate addition content item requests and render additional content items in the web page content 106.

Figure 5B:
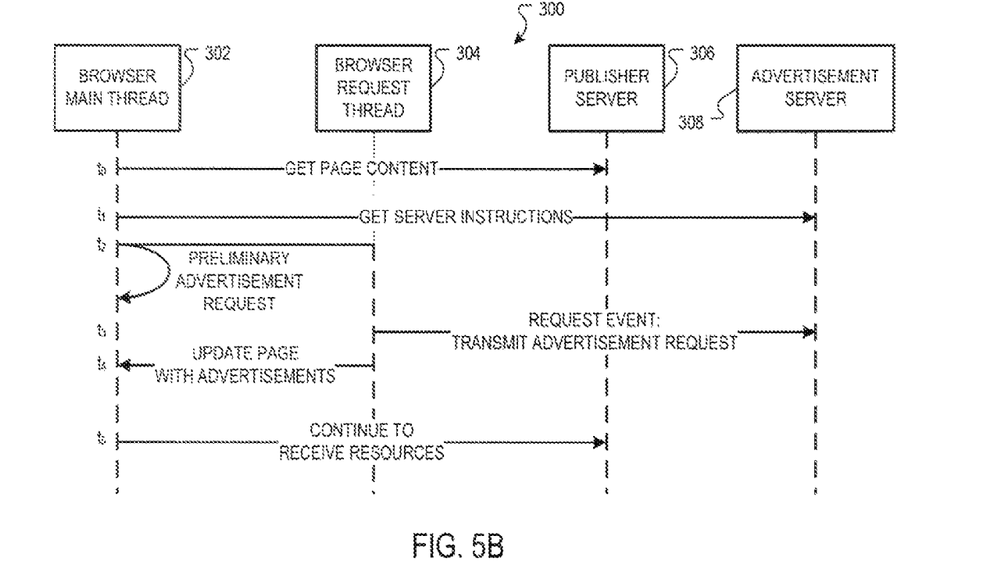
Figure 5C:
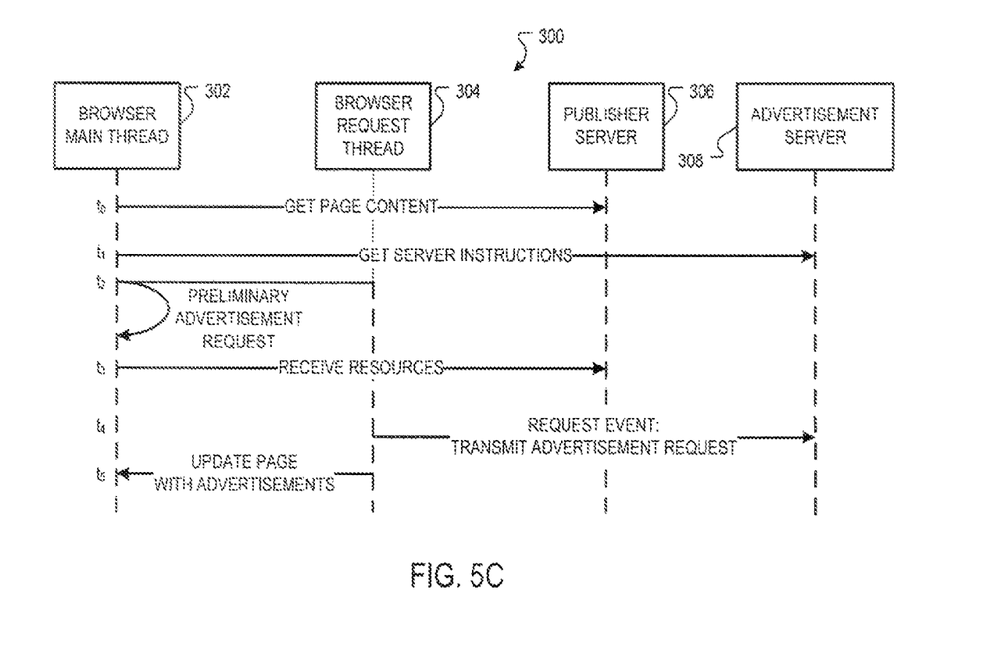

FIG. 5B is the timing diagram 300 of the example advertisement request process illustrating the rendering of a web page for a publisher server 306 that is responding relatively slowly as compared to the advertisement server 308. In this example, the browser main thread 302 receives the requested advertisements at the time $t_4$, and thereafter the publisher server 306 begins to provide resources at the time $t_5$. FIG. 5C is the timing diagram 300 of the example advertisement request process illustrating the rendering of a web page for a publisher server 306 that is responding relatively quickly as compared to the advertisement server 308. In this example, the browser main thread 302 receives all web page resources from the publisher server at the time $t_3$, and thereafter the request event occurs at the time $t_4$. FIGS. 5B and 5C illustrate that the respective performance of each server 306 and 308 does not affect the rendering of the content received from each server 308 and 306, respectively.

Figure 6:
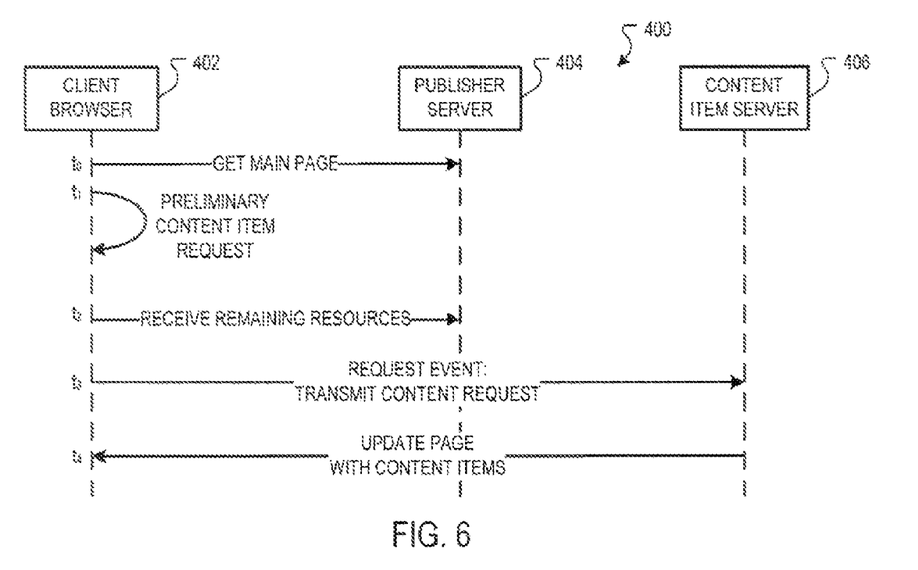
FIG. 6 is a timing diagram of another example content request process.

FIG. 6 is a timing diagram 400 of another content request process. The timing diagram 400 depicts processes associated with a client browser 402, a publisher server 404 and a content item server 406 as time elapses downward along a vertical axis. In the example implementation of FIG. 6, the request event occurs after a relatively long duration, e.g., several seconds, to ensure that the web page content 106 is rendered before processing the content item request instructions, e.g., instructions 116. In this example implementation, the web page content 106 is rendered prior to the loading of the content item request instructions 116. Accordingly, the processing of the content item requests can occur in the same thread as the rendering of the web page content, and a slow or non-responsive content item server 406 will thus not affect the rendering of the web page content. Additionally, because the content item request instructions are not loaded until at least the occurrence of the request event, there is no need to temporarily suppress processing other instructions, e.g., javascripts, to ensure that the web page content 106 is timely rendered.

At a time $t_0$, a request for page content, e.g., page content 106, is transmitted to the publisher server 404, which, in turn, begins to send the page content to the client system 100. At a time $t_1$, the client browser 402 generates a preliminary content item request, which can, for example, instantiate a monitoring process that monitors for the request event. In one implementation, the preliminary advertisement request instantiates a timer that expires at a time $t_3$.

At the time $t_2$, the client browser 402 has received the remaining resources for the page content. Thereafter, at the time $t_3$, in response to the expiration of the timer, the corresponding request instructions are loaded and executed by the client browser 100, which transmits a content item request to the content item server 406. Thereafter, the at the time $t_4$, the client browser updates the web page content with the content items received from the content item server 406.

Figure 7:
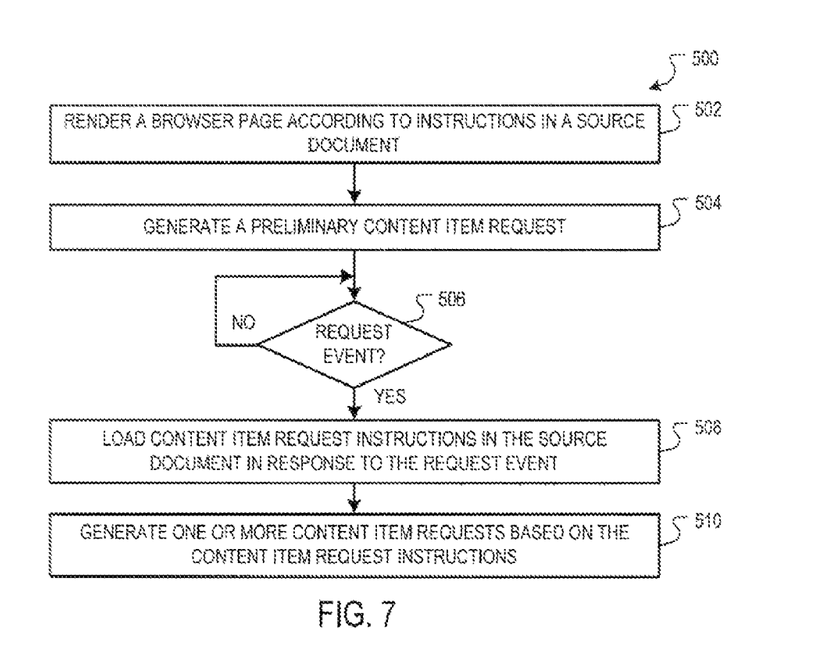
FIG. 7 is an example process for generating content item requests.

FIG. 7 is an example process 500 for generating content item requests. The example process 500 can, for example, be implemented in the client system 100 by rendering the web page content 106 and executing the second instructions 114.

Stage 502 renders a browser page according to instructions in a source document. For example, a client system 100 running a web browser can render a web page according to the web page content 106 received form the publisher 102.

Stage 504 generates a preliminary content item request. For example, execution of the first instructions 112 can generate a preliminary content item request that invokes the execution of the second instructions 114.

Stage 506 monitors for a request event. For example, execution of the monitoring instructions 114a instantiates a process that will trigger a request event. The process can, for example, be realized by a timer, the expiration of which is associated with the occurrence of a request event. If the occurrence of the request event is not detected, the process continues to monitor for the request event. In one implementation, the occurrence of the request event is scheduled to occur at a time sufficient to ensure that the web page content is substantially rendered.

In response to a monitoring of the request event in stage 506, stage 508 loads content item request instructions in the source document in response to the occurrence of the request event. For example, the loading instructions 114b can load content item request instructions that can, upon execution, cause the client system 100 to generate content item request instructions 116 for the content environments 122, 124 and 126.

Stage 510 generates one or more content item requests based on the content item request instructions. For example, the content item request instructions 116 loaded in stage 508 can be executed to generate the content item requests.

Figure 8:
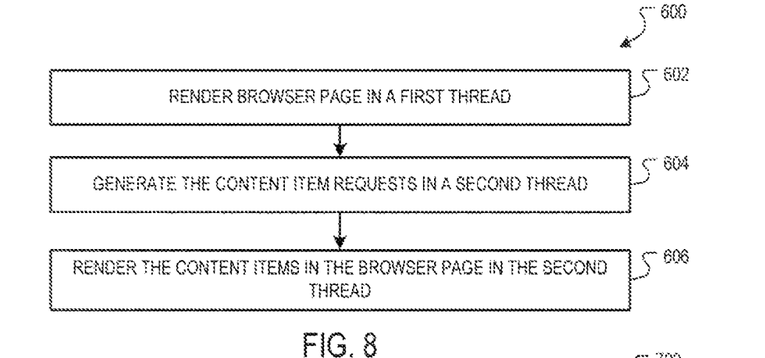
FIG. 8 is an example process for processing a browser page in multiple threads.

FIG. 8 is an example process 600 for processing a browser page in multiple threads. The example process 400 can, for example, be implemented in the client system 100 by rendering the web page content 106 and executing of the second instructions 114.

Stage 602 renders a browser page in a first thread. For example, a client system 100 running a web browser can render a web page according to the web page content 106 received form the publisher 102 in a first thread, such as the browser main thread 202.

Stage 604 generates the content item request in a second thread. For example, execution of the first instructions 112 can generate a preliminary content item request that invokes the execution of the second instructions 114, which, in turn, generates the content item request instructions 116 in a second thread, such as the browser request thread 204. Thereafter, the content item request instructions 116 are executed in the second thread to generate the content item requests.

Stage 606 renders the content items in the browser page in the second thread. For example, the second thread 204 can receive the content items responsive to the content item requests and update the rendered page content with the content items.

Figure 9:
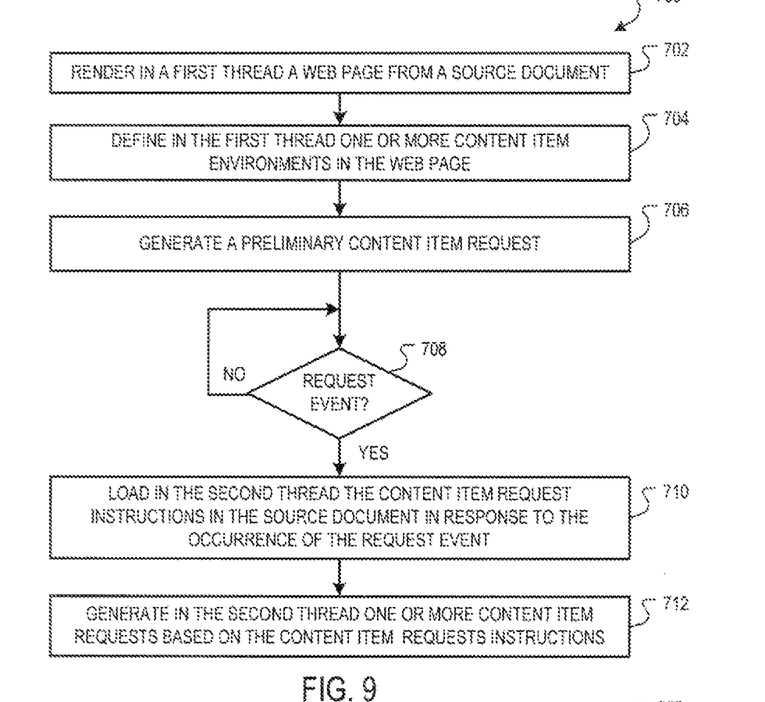
FIG. 9 is another example process for generating content item requests.

FIG. 9 is another example process 700 for generating content item requests. The example process 700 can, for example, be implemented in the client system 100 by rendering the web page content 106 and executing the second instructions 114.

Stage 702 renders in a first thread a web page from a source document. For example, a client system 100 running a web browser can render in a first thread, such as the browser main thread 202, a web page according to the web page content 106 received from the publisher 102.

Stage 704 defines in the first thread one or more content item environments in the web page. For example, execution of the first instructions 112 can define one or more content item environments 122, 124 and 126 for rendering in the web page 106.

Stage 706 generates a preliminary content item request. For example, execution of the first instructions 112 can generate a preliminary content item request that invokes the execution of the second instructions 114.

Stage 708 monitors for a request event. For example, execution of the monitoring instructions 114a can instantiate a timer, the expiration of which corresponds to as request event.

Stage 710 loads in the second thread the content item request instructions in the source document in response to the occurrence of the request event. For example, in response to the monitoring of the occurrence of the request event, the loading instructions 114b can be executed in the second thread to load the content item request instructions 116 in the web page content 106.

Stage 712 generates in the second thread one or more content item requests based on the content item request instructions. For example, the content request instructions 116 can be executed in the second thread to generate the one or more content item requests.

Figure 10:
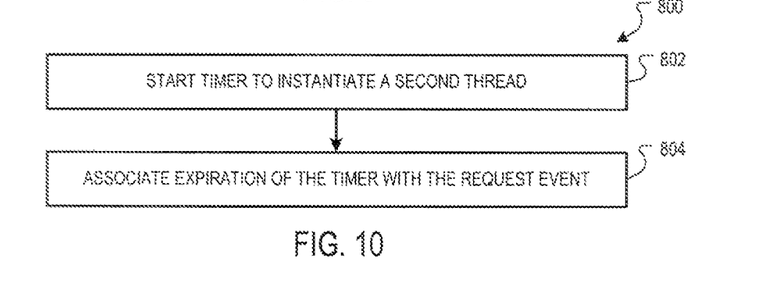
FIG. 10 is an example process for generating a request event.

FIG. 10 is an example process 800 for generating a request event. The example process 800 can, for example, be implemented in the client system 100 by rendering the web page content 106 and executing the second instructions 114 on the client system 100.

Stage 802 starts a timer to instantiate a second thread. For example, the monitoring instructions 114a can define a timer, such as a javascript timer, and the instantiation of the timer instantiates the second thread.

Stage 804 associates expiration of the timer with the request event. For example, the monitoring instructions 114a can define a timer duration, the expiration of which corresponds to the request event, and the loading instructions 114b can be executed in response to the expiration of the timer.

Figure 11:
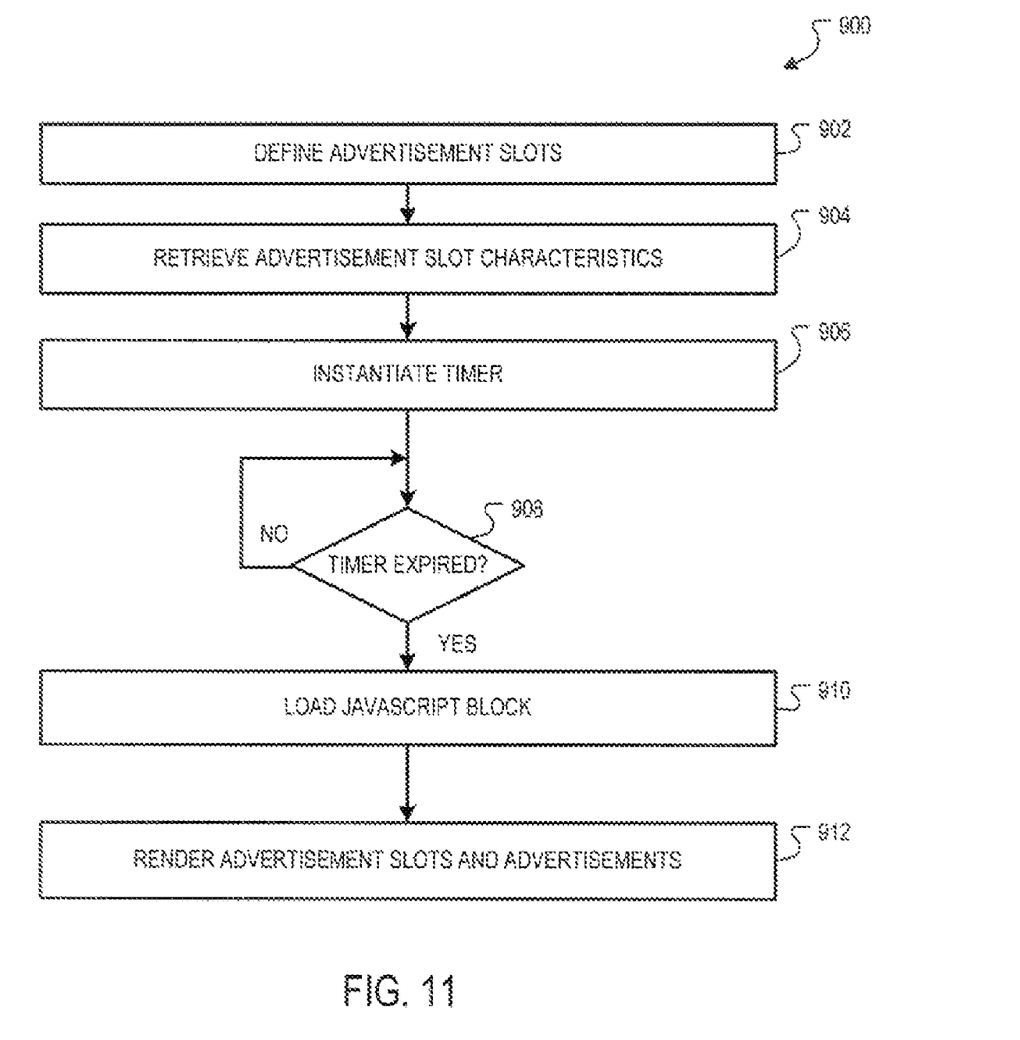
FIG. 11 is another example process for generating advertisement requests.

FIG. 11 is another example process 900 for generating advertisement requests. The example process 900 can, for example, be implemented in the client system 100 by rendering the web page content 106 and execution of the second instructions 114 on the client system 100.

Stage 902 defines advertisement slots. For example, a client system 100 running a web browser can render a web page according to the web page content 106 received form the publisher 102. The advertisement slots can, for example, be defined by executing instructions stored in a head section of an HTML document.

Stage 904 retrieves advertisement slot characteristics. For example, the client system 100 running a web browser can retrieve advertisement slot characteristics from an advertisement server that stores advertisement slot characteristics for the advertisement slots in a publisher's web page. Often a publisher or an advertiser provider may modify an advertisement slot; accordingly, by storing the advertisement slot modifications at the advertisement server, the publisher need not modify the web page content 106.

Stage 906 initiates is timer. For example, execution of the monitoring instructions 114a can instantiate a timer. In one implementation, instantiation of the timer likewise instantiates a separate processing thread.

Stage 908 determines if the timer has expired. If the timer has expired, then stage 910 loads instructions (e.g., a javascript block) in response to the timer expiring. For example, execution of the loading instructions 114b can load the content item request instructions 116 realized as a javascript block in the web page content 106. In one implementation, stages 908 and 910 are processed by the separate thread instantiated in stage 906. The javascript block is executed to retrieve advertisements for the advertisement slots.

Stage 910 renders the advertisement slots and the advertisements. In one implementation, the client system 100 creates an iFrame for each advertisement slot using an onLoad callback. When the onLoad callback is executed, the advertisements may or may not have arrived. The process is repeated until the advertisements are retrieved and rendered in the advertisement slots, or until a retry limit is reached, e.g., a loop value or a time out. In one implementation, stage 912 is implemented in the separate thread instantiated in stage 906.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
rendering, in a first thread in a web browser on a client device, a browser page and content item environments in the browser page according to instructions in a source document, the source document including web page content defining the browser page and the content item environments that are rendered in the browser page, and served from a publisher server;
instantiating, from an execution of instructions in the source document in the first thread, a second thread in the web browser, the second thread being separate from the first thread, the instantiation comprising:
generating, in the first thread in response to executing the instruction in the source document, a preliminary content item request for second instructions, the second instructions including instructions that when executed by the web browser cause the web browser to initiate the second thread by starting a timer in the web browser and load content item request instructions in the second thread; and
executing the second instructions to start the timer;
monitoring, in the second thread in the web browser, for an occurrence of a request event, the monitoring comprising monitoring for an expiration of the timer;
loading, in the second thread in the web browser, the content item request instructions in the source document in response to the occurrence of the request event, the content item request instructions being instructions to request content items for each of the content item environments based on the expiration of the timer; and
generating, in the second thread, a content item request for each of the content item environments to a content item server based on the content item request instructions, the content item server being different from the publisher server;

receiving at the client device content items for each of the content item environments in response to the content item requests; and rendering, in the second thread, the content items in the content item environments of the browser page, the rendering of the content items in the second thread being independent of the rendering of the browser page in the first thread;

wherein the one or more content item requests comprises one or more advertisement requests.

2. The method of claim 1, wherein:
the source document comprises an interpreted document and the content item request instructions comprise Javascript instructions.

3. The method of claim 2, wherein loading, in the second thread, content item request instructions in the source document in response to the occurrence of the request event comprises:
loading the content item request instructions in a head section of the source document.

4. Software stored in a non-transitory computer readable medium in a client device, the software comprising instructions that upon execution by the client device cause the client device to perform the functions of:
rendering, in a first thread in a web browser on a client device, a browser page and content item environments in the browser page from a source document, the source document including web page content defining the browser page and the content item environments that are rendered in the web page, and served from a publisher server;
instantiating, from an execution of instructions in the source document in the first thread, a second thread in the web browser, the second thread being separate from the first thread, the instantiation comprising:
generating, in the first thread and in response to executing the instructions in the source document, a preliminary advertisement request for second instructions, the second instructions including instructions that, when executed by the web browser, cause the web browser to initiate the second thread by starting a timer in the web browser and load the advertisement request script in the second thread; and
executing the second instructions to start the timer;
monitoring, in the second thread in the web browser, for an occurrence of a request event, wherein the monitoring comprises monitoring for an expiration of the timer;
loading, in the second thread in the web browser, the advertisement request script in the source document in response to an occurrence of the request event, the advertisement request instructions being instruction to request advertisements for each of the content item environments, based on the expiration of the timer;
executing, in the second thread, the advertisement request script to generate and transmit an advertisement request for each of the content item environment to a content item server, the content item server being different from the publisher server;
receiving at the client advertisements for each of the content item environments in response to the advertisement requests; and
rendering, in the second thread, the advertisements in the content item environments of the browser page, the rendering of the content items in the second thread being independent of the rendering of the browser page in the first thread.

5. The software of claim 4, comprising further instructions that upon execution by the client device cause the client device to perform the functions of:
loading, in the second thread, the advertisement request script in a head section of the source document.

6. A system, comprising:
a processing device; and
a memory storage device in data communication with the processing device and storing instructions executable by the processing device that upon such execution cause the processing device to perform operations comprising:
rendering, in a first thread in a web browser on a client device, a browser page and content item environments in the browser page according to instructions in a source document, the source document including web page content defining the browser page and the content item environments that are rendered in the browser page, and served from a publisher server;
instantiating, from an execution of instructions in the source document in the first thread, a second thread in the web browser, the second thread being separate from the first thread, the instantiation comprising:
generating, in the first thread and in response to executing the instruction in the source document, a preliminary content item request for second instructions, the second instructions including instructions that, when executed by the web browser, cause the web browser to initiate the second thread by starting a timer in the web browser and load the content item request instructions in the second thread starting a timer; and
executing the second instructions to start the timer;
monitoring, in the second thread in the web browser, for an occurrence of a request event wherein the monitoring comprises monitoring for an expiration of the timer;
loading, in the second thread in the web browser, the content item request instructions in the source document in response to the occurrence of the request event, the content item request instructions being instruction to request content items for each of the content item environments, based on the expiration of the timer; and
generating, in the second thread, a content item request for each of the content item environment to a content item server based on the content item request instructions, the content item server being different from the publisher server;
receiving at the client device content items for each of the content item environments in response to the content item requests; and
rendering, in the second thread, the content items in the content item environments of the browser page, the rendering of the content items in the second thread being independent of the rendering of the browser page in the first thread;
wherein the one or more content item requests comprises one or more advertisement requests.

7. The system of claim 6, wherein:
the source document comprises an interpreted document and the content item request instructions comprise Javascript instructions.

8. The system of claim 7, wherein loading, in the second thread, content item request instructions in the source document in response to the occurrence of the request event comprises:
loading the content item request instructions in a head section of the source document.

* * * * *